(12) United States Patent
Kubek

(10) Patent No.: US 12,320,967 B2
(45) Date of Patent: Jun. 3, 2025

(54) POSITIONING DEVICE FOR AN IMAGING DEVICE AND METHOD

(71) Applicant: Leica Microsystems CMS GmbH, Wetzlar (DE)

(72) Inventor: Martin Kubek, Wetzlar (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 0 days.

(21) Appl. No.: 18/864,921

(22) PCT Filed: Mar. 21, 2023

(86) PCT No.: PCT/EP2023/057135
§ 371 (c)(1),
(2) Date: Nov. 12, 2024

(87) PCT Pub. No.: WO2023/222283
PCT Pub. Date: Nov. 23, 2023

(65) Prior Publication Data
US 2025/0110323 A1 Apr. 3, 2025

(30) Foreign Application Priority Data
May 18, 2022 (EP) .................................... 22174057

(51) Int. Cl.
G02B 21/36 (2006.01)
G02B 21/26 (2006.01)

(52) U.S. Cl.
CPC ........... *G02B 21/362* (2013.01); *G02B 21/26* (2013.01)

(58) Field of Classification Search
CPC ...... G02B 21/362; G02B 21/26; G02B 21/24; G02B 21/34; G02B 21/36; G02B 21/00; G02B 21/002; G02B 21/0036; G02B 21/0088
See application file for complete search history.

(56) References Cited

U.S. PATENT DOCUMENTS

2011/0089771 A1 4/2011 Brooker et al.
2014/0056782 A1* 2/2014 Alexander ............... G01N 1/28
422/534

FOREIGN PATENT DOCUMENTS

CN 210427932 U 4/2020
JP 2011100629 A * 5/2011

* cited by examiner

Primary Examiner — Stephone B Allen
Assistant Examiner — Adam W Booher
(74) Attorney, Agent, or Firm — LEYDIG, VOIT & MAYER, LTD.

(57) ABSTRACT

A positioning device for an imaging device includes a base element having a first opening, a first circle element arranged rotatably in the first opening and having a second opening, and a second circle element arranged rotatably in the second opening and having a third opening. A center of rotation of the second circle element is eccentric with respect to a center of rotation of the first circle element. The positioning device further includes a third circle element arranged rotatably in the third opening. A center of rotation of the third circle element is eccentric with respect to the center of rotation of the second circle element. The third circle element has a fourth opening configured to receive a sample carrier.

15 Claims, 4 Drawing Sheets

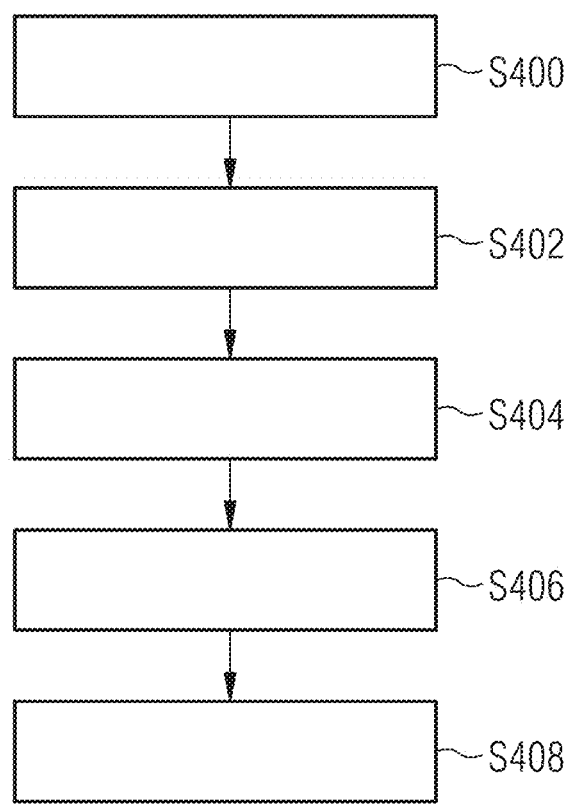

POSITIONING DEVICE FOR AN IMAGING DEVICE AND METHOD

CROSS REFERENCE TO RELATED APPLICATIONS

This application is a U.S. National Phase application under 35 U.S.C. § 371 of International Application No. PCT/EP2023/057135, filed on Mar. 21, 2023, and claims benefit to European Patent Application No. EP 22174057.4, filed on May 18, 2022. The International Application was published in English on Nov. 23, 2023 as WO 2023/222283 A1 under PCT Article 21(2).

FIELD

Embodiments of the present invention relate to a positioning device for an imaging device. Embodiments of the present invention also relate to an imaging device, in particular a microscope. Further, embodiments of the invention relate to a method for positioning a sample, and to a computer program product.

BACKGROUND

Microscopes typically comprise a microscope stage configured to position a sample in the field of view of the microscopes optical system. Typical microscope stages comprise two or more rectangular plates arranged one above the other. A first plate is configured to be moved along the x-direction, and a second plate is configured to be moved along the y-direction. Thereby, the known microscope stage provides two degrees of freedom in which the sample can be moved. For this reason, microscope stages having two degrees of freedom are also called xy-tables. The plates are typically provided with a linear guide on two sides and may be moved by a motor. The plates may comprise an opening in which a sample carrier having the sample mounted upon is received, and through which the sample may be observed or illuminated.

However, the known plate based microscope stages have a number disadvantages: The rectangular plates are not supported on at least two sides, and are therefore susceptible to vibration. Typically, there is a sizable gap between the plates. This arrangement is unfavorable for incubation applications, since the gap needs to be provided with a gastight seal before the arrangement can be used in an incubation application. Further, there is a risk of for example a sample carrier getting caught in the gap between the plates and being crushed. Since the plates are arranged atop of each other the arrangement of plates is also very thick. A microscope objective may therefore need to be moved deep into the opening in order to observe the sample. Thus, there is also a risk of the microscope objective colliding with the plates when the plates are moved. Lastly, the microscope stage cannot easily be integrated into a microscope housing, as space needs to be reserved in the periphery of the stage due to the extension of the plates.

SUMMARY

Embodiments of the present invention provide a positioning device for an imaging device. The positioning device includes a base element having a first opening, a first circle element arranged rotatably in the first opening and having a second opening, and a second circle element arranged rotatably in the second opening and having a third opening. A center of rotation of the second circle element is eccentric with respect to a center of rotation of the first circle element. The positioning device further includes a third circle element arranged rotatably in the third opening. A center of rotation of the third circle element is eccentric with respect to the center of rotation of the second circle element. The third circle element has a fourth opening configured to receive a sample carrier.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 is a flowchart of a method for positioning a sample with the positioning device according FIGS. 2 and 3, according to some embodiments.

DETAILED DESCRIPTION

Figure 1:
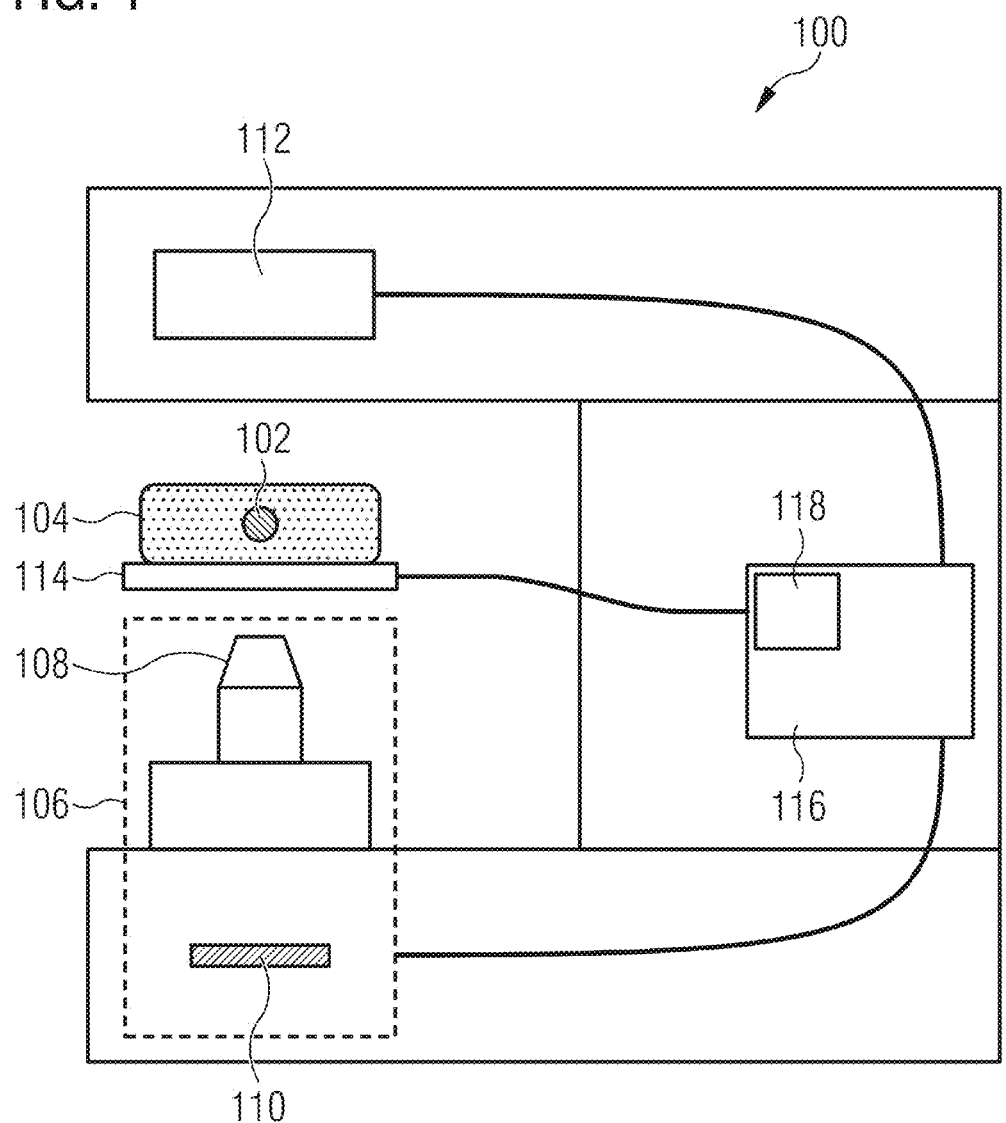
FIG. 1 is a schematic view of an imaging device according to an embodiment.

Embodiments of the present invention provide a positioning device for an imaging device and a method for positioning a sample that overcome the aforementioned disadvantages of plate based microscope stages.

According to some embodiments, the positioning device for an imaging device comprises a base element having a first opening, a first circle element arranged rotatably in the first opening, the first circle element having a second opening, a second circle element arranged rotatably in the second opening and having a third opening. The center of rotation of the second circle element is eccentric with respect to the center of rotation of the first circle element. The positioning device further comprises a third circle element arranged rotatably in the third opening. The center of rotation of the third circle element is eccentric with respect to the center of rotation of the second circle element, and wherein the third circle element comprises a fourth opening configured to receive a sample carrier.

Due to the eccentricity of the center of rotation of the second circle element and the third circle element, the fourth opening can be move freely inside the first opening by simply rotating the first circle element and the second circle element. The orientation of the fourth opening can further be controlled by rotating the third circle element. Thus, a sample mounted on the sample carrier received in the fourth opening can be moved freely inside the first opening. The proposed positioning device therefore has three degrees of freedom. The sample can be moved in the x-direction and the y-direction and can additionally be rotated.

The circle elements are nested within each other and are all arranged in one plane. Thus, compared to a positioning device comprising plates arranged atop of each other, the proposed positioning device is very flat. Because of this flatness, an objective of the imaging device can be moved very close to the sample located in the fourth opening without the risk of the microscope objective colliding with the positioning device. The circle elements are supported along their circumference by their respective supporting element. This results in a higher stiffness of the arrangement of circle elements, and thus better vibration characteristics since no vibration direction dominates. Further, since the circle elements are supported along their circumference there is no substantial gap between two adjacent elements. This significantly reduces the risk of an object, for example a sample carrier, a piece of cloth or a finger of a user, getting caught between two of the elements. This makes the positioning device safer to operate. Further, the gap between two adjacent elements can very easily be provided with a gastight seal, making the proposed positioning device suitable for incubation applications. The circle elements only move within the area of the first opening of the base element. The footprint of the positioning device is therefore entirely defined by the base element. No moving element will extend over the base element. This simple geometry makes it easy to integrate the positioning device into a housing of the imaging device. Thus, the proposed positioning device overcomes all of the abovementioned disadvantages of plate based positioning device.

In a preferred embodiment, the positioning device comprises a controller configured to receive a user input, to determine based on the user input a second position of the fourth opening within the first opening, and to move the fourth opening from an initial position to the second position by rotating at least the first circle element, and the second circle element relative to each other. The user input defines the second position. At least the first circle element and the second circle element are then rotated in order to position the fourth opening, and thus the sample carrier and the sample at the second position. The rotation of the first circle element and the second circle element are controlled by the controller, thus the positioning device can be used to automatically move the sample carrier mounted in the fourth opening.

In another preferred embodiment, the controller is configured to translate the user input into a rotation of at least the first circle element, and the second circle element. Each position of the fourth opening inside the first opening corresponds to a unique rotational position of the first circle element and the second circle element. In this embodiment, the controller is configured to translate the user input which may be in the form of a cartesian coordinate, i.e. x-y-position, into a rotation of the first and second circle elements. Thus, the user only needs to input an x-y-position in order to position the sample making the positioning device easy to use.

In another preferred embodiment, the controller is configured to determine based on the user input a first relative rotation between the base element and the first circle element, and a second relative rotation between the first circle element and the second circle element. The controller is further configured to rotate the first circle element according to the first relative rotation, and the second circle element according to the second relative rotation in order to move the fourth opening to the second position. In this embodiment, the translation of the user input into the rotation of the first and second circle elements is realized by determining the first relative rotation and the second relative rotation. In particular, the controller may translate the user input which may be in the form of a cartesian coordinate into the first relative rotation and the second relative rotation which may be in the form of polar coordinates.

In another preferred embodiment, the controller is configured to determine based on the user input a third relative rotation between the second circle element and the third circle element. The controller is further configured to rotate the third circle element according to the third relative rotation in order to move the fourth opening to the second position. The rotation of the third circle element orients the fourth opening, and thus the sample carrier received therein. In this embodiment, the user input comprises information about the desired orientation of the sample carrier. The controller is configured to translate the desired orientation into the third relative rotation. Since orientation of the fourth opening also depends on the rotational position of the first circle element and the second circle element, the controller preferably takes these into account when determining the third relative rotation. The positioning device according to this embodiment can be used to automatically orient the sample carrier mounted in the fourth opening, thereby automating all three degrees of freedom making the positioning device even more easy to use.

In another preferred embodiment, the controller is configured to determine the third relative rotation such that the relative rotation of the third circle element with respect to the base element is the same in the initial position and the second position. Rotating the first circle element and the second circle element necessarily rotates the fourth opening, and thus the sample carrier received therein. In order to emulate the linear movement of a known plate based positioning device, the controller according to this embodiment preserves the orientation of the fourth opening. In particular, the controller may also be configured to facilitate a linear movement of the fourth opening between the initial position and the second position. Thereby, a user already familiar with known microscope stages can easily adapt to use the positioning device according to this embodiment.

In another preferred embodiment, the positioning unit comprises a first drive unit configured to rotate the first circle element, a second drive unit configured to rotate the second circle element, and a third drive unit configured to rotate the third circle element. The drive unit may in particular be motor units or magnetic drives. The drive units are in particular controlled by the controller. In this embodiment, the movements of the circle elements are motorized by the drive units. Thereby, the positioning of the fourth opening, and thus the sample carrier is completely automated.

In another preferred embodiment, the first drive unit is arranged on the base element, the second drive unit is arranged on the first circle element, and the third drive element is arranged on the second circle element. In this arrangement, the drive unit and the circle element moved by said drive unit are mounted on the same element. This configuration is mechanically very stable and facilitates a very low vibration movement of the circle elements.

In another preferred embodiment, the first drive unit, the second drive unit, and the third drive unit each comprise a stepper motor. Alternatively, the first drive unit, the second drive unit, and the third drive unit each comprise a linear motor. Linear motors and stepper motors can be used to precisely control a movement. In this embodiment it is therefore possible to control the rotation of the circle elements, and thus the position of the fourth opening very precisely.

In another preferred embodiment, the positioning device comprises a first position determination unit configured to determine the position of the first circle element relative to the base element, a second position determination unit configured to determine the position of the second circle element relative to the first circle, and a third position determination unit configured to determine the position of the third circle element relative to the second circle element. The relative position, i.e. their angle towards each other, of the circle element to each other uniquely determines the position and orientation of the fourth opening. The position determination units may therefore be used to precisely determine the position and orientation of the fourth opening, and thus the sample carrier received therein. This information can be used by the control unit to control the positioning device with even greater precision.

In another preferred embodiment, the first opening, the second opening, and the third opening are circular; wherein the second opening is eccentric with respect to the first circle element; and wherein the third opening is eccentric with respect to the second circle element. In this embodiment the circle elements are supported over their entire circumference by their respective supporting element. This provides an even greater stiffness of the arrangement of circle elements and therefore an even smoother rotation.

In another preferred embodiment, the fourth opening is rectangular. A rectangular opening can easily receive most sample carriers, in particular microscope slides and microwell plates. Thus, the present embodiment is compatible with most sample carriers.

In another preferred embodiment, the first circle element, the second circle element, and the third circle element are mounted by rolling bearings. Rolling bearings create very little vibration when the circle element rotate. Thus, the rolling bearings allow the circle element to run very smoothly.

Embodiments of the invention also relate to an imaging device comprising the positioning device described above. Preferably, the imaging device is a microscope, in particular an inverse microscope. The imaging device has the same advantages as the positioning device described above.

Embodiments of the invention also relate to a method for positioning a sample with a positioning device described above. The method comprises the following steps: Arranging a sample carrier carrying the sample in the fourth opening. Determining based on a user input a second position of the fourth opening within the first opening. Moving the fourth opening from an initial position to the second position by rotating at least the first circle element, and the second circle element relative to each other.

The method has the same advantages as the positioning device described above and can be supplemented using the features of the dependent claims directed at the positioning device.

Embodiments of the invention further relate to a computer program product comprising a program code configured to perform the method described above, when the computer program product is run on a processor.

The computer program product has the same advantages as the positioning device and the method described above, and can in particular be supplemented using the features of the dependent claims directed at the positioning device.

FIG. 1 is a schematic view of an imaging device 100 according to an embodiment.

In the present embodiment, the imaging device 100 is exemplary formed as an inverse microscope. However, the imaging device 100 may also be any other type of microscope, e.g. an upright microscope or a box type microscope. In particular, the imaging device 100 is not limited to be a microscope. The imaging device 100 may for example be a device for inspecting semiconductor work pieces.

The imaging device 100 is configured to image a sample 102 arranged on a sample carrier 104, for example a microscope slide, a microwell plate or a petri dish. For capturing an image of the sample 102, the imaging device 100 comprises an optical imaging system 106. The optical imaging system 106 comprises an objective 108 directed at the sample 102 from below, and a detector element 110. The objective 108 receives detection light emitted by the sample 102 and directs the received detection light towards the detector element 110. An illumination unit 112 configured to illuminate the sample 102 is exemplary arranged above the sample 102. Thus, the imaging device 100 according to the present embodiment is configured for transmitted light microscopy. The sample carrier 104 and the sample 102 are arranged on a positioning device 114 configured to position the sample 102 in the field of view of the objective 108. The positioning device 114 is described below in more detail with reference to FIGS. 2 and 3.

The imaging device 100 further comprises a control unit 116. The control unit 116 is connected to the optical imaging device 100, the illumination unit 112, and the positioning device 114, and configured to control the imaging device 100. In particular, the control unit 116 comprises a controller 118 configured to control the positioning device 114. The controller 118 of the positioning device 114 is configured to perform a method for positioning the sample 102 that is described below with reference to FIG. 4.

Figure 2:
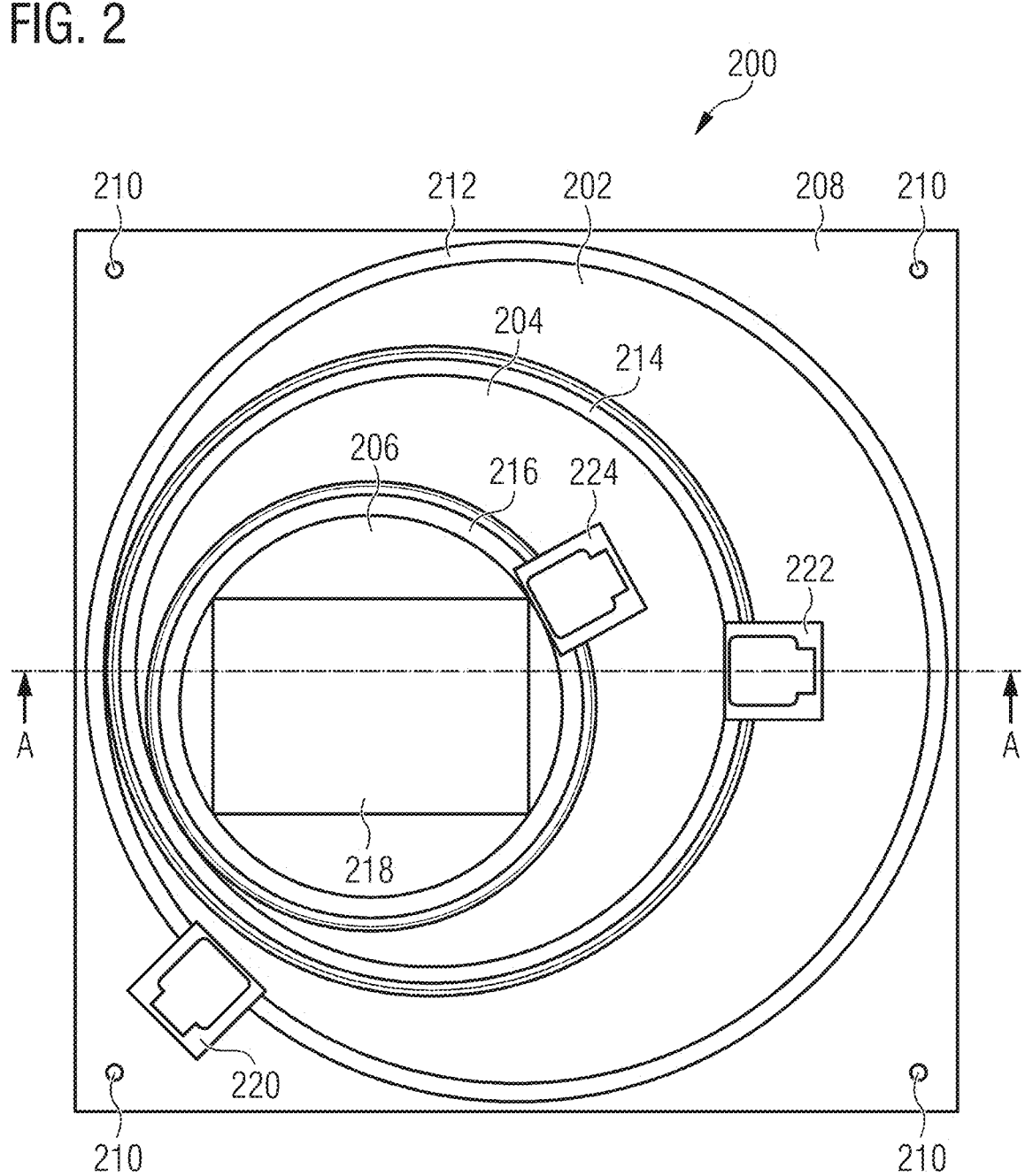
FIG. 2 is a schematic top view of a positioning device of the imaging device according to FIG. 1, according to some embodiments.

FIG. 2 is a schematic top view of the positioning device 200 of the imaging device 100 according to FIG. 1.

Contrary to known plate based positioning devices which position the sample carrier 104 by a linear movement of plates, the positioning device 200 shown in FIG. 2 positions the sample carrier 104 by a rotational movement of three circle elements 202, 204, 206. The three circle elements 202, 204, 206 are nested within each other and can rotate eccentrically relative to each other. The relative eccentric rotation allows a third circle element 206, which is the smallest of the three nested circle elements 202, 204, 206, to be positioned freely within the diameter of a first circle element 202, which is the biggest of the three nested circle elements 202, 204, 206. Thereby, the sample carrier 104 which is arranged on the third circle element 206, may also be positioned freely within the diameter of the first circle element 202.

The positioning device 200 comprises a base element 208 exemplary shown to have a square footprint. The base element 208 may be fixed to the imaging device 100 by means of bolt holes 210. Fixing the positioning device 200 prevents the positioning device 200 from moving relative to the imaging device 100. A first opening 212 of the base element 208 is circular and has a diameter that is slightly smaller than the length of an edge of the base element 208.

The three circle elements 202, 204, 206 are all received in the first opening 212 of the base element 208. The diameter of the first circle element 202 is chosen such that the first circle element 202 fits the first opening 212. Thus, the first circle element 202 is mounted along its entire circumference by the base element 208. The first circle element 202 can rotate freely within the first opening 212, and its axis of rotation is perpendicular to the image plane of FIG. 2. The first circle element 202 has a second opening 214 that is circular and arranged eccentrically with respect to the first circle element 202. The diameter of the second opening 214 is about three quarters of the diameter of the first circle element 202.

A second circle element 204 is received in the second opening 214. The diameter of the second circle element 204 is smaller than the first circle element 202, and chosen such that the second circle element 204 fits the second opening 214. Thus, the second circle element 204 is mounted along its entire circumference by the first circle element 202. The second circle element 204 can rotate freely within the second opening 214, and its axis of rotation is also perpendicular to the image plane of FIG. 2. The axis of rotation of the second circle element 204 is eccentric with respect to the first circle element 202. The second circle element 204 has a third opening 216 that is circular and arranged eccentrically with respect to the second circle element 204. The diameter of the third opening 216 is about three quarters of the diameter of the second circle element 204 or about half of the diameter of the first circle element 202.

The third circle element 206 is received in the third opening 216. The diameter of the third circle element 206 is smaller than the second circle element 204, and chosen such that the third circle element 206 fits the third opening 216. Accordingly, the third circle element 206 is mounted along its entire circumference by the second circle element 204. The third circle element 206 can rotate freely within the third opening 216, and its axis of rotation is also perpendicular to the image plane of FIG. 2. The axis of rotation of the third circle element 206 is eccentric with respect to the second circle element 204. The third circle element 206 has a fourth opening 218 that is rectangular and configured to receive the sample carrier 104. The fourth opening 218 goes from top to bottom through the entire positioning device 200, and thereby allows the sample 102 mounted on the sample carrier 104 to be observed from below.

In order to automatically rotate the three circle elements 202, 204, 206, the positioning devices comprises three drive units 220, 222, 224 that are exemplary formed to be motor units. A first drive unit 220 is arranged on the base element 208 and configured to rotate the first circle element 202. A second drive unit 222 is arranged on the first circle element 202 and configured to rotate the second circle element 204. A third drive unit 224 is arranged on the second circle element 204 and configured to rotate the third circle element 206. According to the present embodiment, each of the circle elements 202, 204, 206 is moved by the drive unit 220, 222, 224 that is mounted on the same element 204, 206, 208 as the respective circle element 202, 204, 206. Other configurations are possible. For example, each of the circle elements 202, 204, 206 may mount a drive unit that rotates the respective circle element 202, 204, 206. Alternatively, the drive units 220, 222, 224 may also all be mounted by the base element 208.

The positioning device 200 is described in more detail below with reference to FIG. 3 which shows a sectional view of the positioning device 200. A dashed line A in FIG. 2 indicates the sectional axis of the sectional view of FIG. 3.

Figure 3:
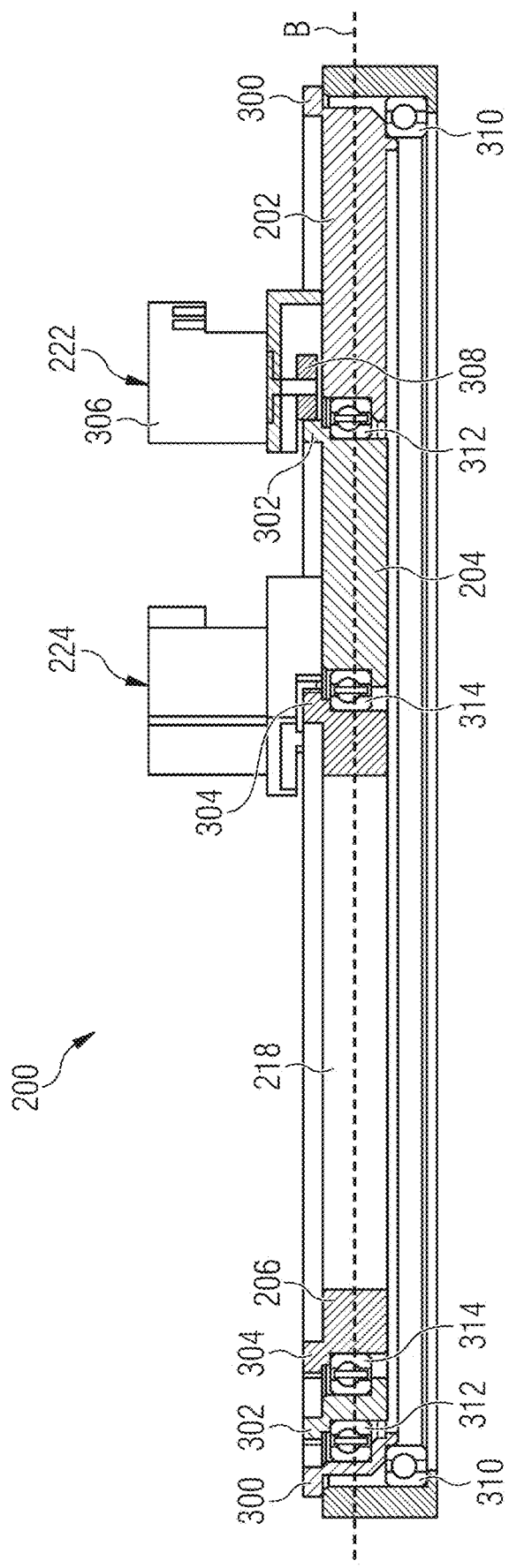
FIG. 3 is a schematic sectional view of the positioning device according to FIG. 2, according to some embodiments.

FIG. 3 is a schematic sectional view of the positioning device 200 according to FIG. 2.

As can be seen in FIG. 3, the nested circle elements 202, 204, 206 are arranged in a single plane denoted by a dashed line B. This arrangement gives the positioning device 200 according to FIGS. 2 and 3 a flat profile when viewed from the side. Due to the flatness of the positioning device 200, the objective 108 of the imaging device 100 can be moved very close to the sample 102 arranged on the sample carrier 104 when it is received in a top portion of the fourth opening 218, without actually moving into the fourth opening 218. This greatly reduces the risk of the objective 108 colliding with the positioning device 200.

As can also be seen in FIG. 3, there is no sizeable gap between two neighboring circle elements 202, 204, 206 as well as between the first circle element 202 and the base element 208. Further, the small gaps are covered each from the top by a lid portion 300, 302, 304 of the respective circle element 202, 204, 206. The lid portions prevents 300, 302, 304 foreign objects from getting caught in the small gap. By providing the lid portions 300, 302, 304 with for example a rubber lip, a gas tight seal for an incubation application can be provided.

FIG. 3 exemplary shows a sectional view of a second drive unit 222 mounted on the first circle element 202 configured to rotate the second circle element 204. The drive units 220, 222, 224 are exemplary arranged atop the circle elements 202, 204, 206. Each of the drive units 220, 222, 224 comprises a motor 306 driving a cogwheel 308 that engages with a pinion of one of the lid portions 300, 302, 304. Rotating the cogwheel 308 moves the respective lid portion 300, 302, 304, and thereby one of the circle elements 202, 204, 206 relative to the element 304, 306, 308 on which the respective drive unit is mounted 220, 222, 224. Other arrangements than the one shown in FIG. 3 are possible. For example, one of more of the drive units 220, 222, 224 may comprise a linear motor arranged over the entire circumference of one of the circle elements 202, 204, 206.

The circle elements 202, 204, 206 are mounted by rolling bearings 310, 312, 314 each. The rolling bearings 310, 312, 314 ensure a smooth running of the circle elements 202, 204, 206. All circle elements 202, 204, 206 are mounted over their entire circumference by the rolling bearings 310, 312, 314 making the arrangement of the circle elements 202, 204, 206 very stiff, and thereby further reducing vibrations. The rolling bearings 312 mounting the second circle element 204 and the rolling bearings 314 mounting the third circle element 206 are arranged in the same plane as the respective circle elements 204, 206. The rolling bearings 310 mounting the first circle element 202 are arranged below the first circle element 202. This arrangement allows the diameter of the first circle element 202 to be as big as possible compared to the footprint of the base element 208. Making the diameter of the first circle element 202 large is important since the diameter of the first circle element 202 determines the area in which the sample carrier 104 can be moved.

FIG. 4 is a flowchart of a method for positioning the sample 102 with the positioning device 200 according FIGS. 2 and 3.

During the process the method defines, the third circle element 206 is moved from an initial position to a second position. Thereby, the sample carrier 104 received in the fourth opening 218 of the third circle element 206 is also moved from the initial position to the second position. Both the initial position and the second position are located inside the diameter of the first circle element 202.

The process is started in step S400. In step S402 the controller 118 of the positioning device 200 receives a user input, for example via a user input device such as a keyboard and/or mouse. The user input comprises at least a position information and may comprise an orientation information. The position information may be an absolute position, i.e. a position with respect to the positioning device 200, or a relative position, i.e. a position with respect to the current position. An absolute position may be denoted by a set of cartesian coordinates. A relative position may be denoted in the form of a vector. The orientation information may either comprise an absolute orientation, i.e. a rotation with respect to the positioning device 200, or a relative orientation, i.e. a rotation with respect to the current rotation. In particular, the orientation information may comprise that the absolute orientation needs to be the same in the initial position and the second position and/or that the orientation should not change during the movement between the initial position and the second position.

In step S404 the controller 118 determines relative rotations of the three circle elements 202, 204, 206 with respect to each other in order to position and orient the sample carrier 104 received in the fourth opening 218 according to the user input. Each position of the third circle element 206 is uniquely determined by a first relative rotation between the base element 208 and the first circle element 202, and a second relative rotation between the first circle element 202 and the second circle element 204. Each orientation of the third circle element 206 is uniquely determined by the first relative rotation, the second relative rotation, and a third relative rotation between the second circle element 204 and the third circle element 206. Accordingly, the controller 118 determines the first relative rotation, the second relative rotation, and the third relative rotation based on the user input.

In step S406 the circle elements 202, 204, 206 are moved by the drive units 220, 222, 224 according to the first relative rotation, the second relative rotation, and the third relative rotation. Although the position and the orientation of the third circle element 206 are uniquely determined by the first relative rotation, the second relative rotation, and the third relative rotation, there is no unique path between the initial position and the second position. Additional constraints may be placed on the path, for example that the third circle element 206 moves linearly or in a straight line. After the third circle element 206 has reached the second position, the process is stopped in step S408.

Identical or similarly acting elements are designated with the same reference signs in all Figures. As used herein the term "and/or" includes any and all combinations of one or more of the associated listed items and may be abbreviated as "/". Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 imaging device
102 sample
104 sample carrier
106 optical imaging system
108 objective
110 detector element
112 illumination unit
114 positioning device
116 control unit
118 controller
200 positioning device
202, 204, 206 circle element
208 base element
210 bolt hole
212, 214, 216, 218 opening
220, 222, 224 drive unit
300, 302, 304 lid portion
306 motor
308 cogwheel
310, 312, 314 rolling bearings
A, B lines

The invention claimed is:

1. A positioning device for an imaging device, the positioning device comprising
 a base element having a first opening,
 a first circle element arranged rotatably in the first opening and having a second opening,
 a second circle element arranged rotatably in the second opening, and having a third opening, wherein a center of rotation of the second circle element is eccentric with respect to a center of rotation of the first circle element, and
 a third circle element arranged rotatably in the third opening, wherein a center of rotation of the third circle element is eccentric with respect to the center of rotation of the second circle element, and wherein the third circle element has a fourth opening configured to receive a sample carrier.

2. The positioning device according to claim 1, further comprising a controller configured to:
 receive a user input,
 determine, based on the user input, a second position of the fourth opening within the first opening, and
 move the fourth opening from an initial position to the second position by rotating at least the first circle element, and the second circle element relative to each other.

3. The positioning device according to claim 2, wherein the controller is further configured to translate the user input into a rotation of at least the first circle element, and the second circle element.

4. The positioning device according to claim 2, wherein the controller is further configured to;

determine, based on the user input, a first relative rotation between the base element and the first circle element, and a second relative rotation between the first circle element and the second circle element; and rotate the first circle element according to the first relative rotation, and rotate the second circle element according to the second relative rotation in order to move the fourth opening to the second position.

5. The positioning device according to claim 4, wherein the controller is configured to determine, based on the user input, a third relative rotation between the second circle element and the third circle element; and rotate the third circle element according to the third relative rotation in order to move the fourth opening to the second position.

6. The positioning device according to claim 5, wherein the controller is configured to determine the third relative rotation such that a relative rotation of the third circle element with respect to the base element is same in the initial position and the second position.

7. The positioning device according to claim 1, further comprising:

a first drive unit configured to rotate the first circle element, a second drive unit configured to rotate the second circle element, and a third drive unit configured to rotate the third circle element.

8. The positioning device according to claim 7, wherein the first drive unit is arranged on the base element, the second drive unit is arranged on the first circle element, and the third drive element is arranged on the second circle element.

9. The positioning device according to claim 7, wherein the first drive unit, the second drive unit, and the third drive unit each comprise a stepper motor.

10. The positioning device according to claim 7, wherein the first drive unit, the second drive unit, and the third drive unit each comprise a linear motor.

11. The positioning device according to claim 1, further comprising:

a first position determination unit configured to determine a position of the first circle element relative to the base element, a second position determination unit configured to determine a position of the second circle element relative to the first circle, and a third position determination unit configured to determine a position of the third circle element relative to the second circle element.

12. The positioning device according to claim 1, wherein the first opening, the second opening, and the third opening are circular, wherein the second opening is eccentric with respect to the first circle element, and wherein the third opening is eccentric with respect to the second circle element.

13. An imaging device comprising a positioning device according to claim 1.

14. A method for positioning a sample with a positioning device according to claim 1, the method comprising arranging a sample carrier carrying the sample in the fourth opening;

determining, based on a user input, a second position of the fourth opening within the first opening;

moving the fourth opening from an initial position to the second position by rotating at least the first circle element, and the second circle element relative to each other.

15. A non-transitory computer-readable medium having a program code stored thereon, the program code, when executed by a computer processor, causing performance of the method according to claim 14.

* * * * *